United States Patent
Endo et al.

(10) Patent No.: US 11,941,921 B2
(45) Date of Patent: Mar. 26, 2024

(54) MAINTENANCE INFORMATION MANAGEMENT DEVICE AND MAINTENANCE INFORMATION MANAGEMENT METHOD

(71) Applicant: TOYOTA JIDOSHA KABUSHIKI KAISHA, Aichi-ken (JP)

(72) Inventors: Masato Endo, Nagoya (JP); Yasuyuki Kamezaki, Toyota (JP); Yasuhiro Murata, Toyota (JP); Takeo Moriai, Nagakute (JP); Kosuke Sakakibara, Toyota (JP); Kenta Miyahara, Okazaki (JP); Takashi Hayashi, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 2 days.

(21) Appl. No.: 17/841,594

(22) Filed: Jun. 15, 2022

(65) Prior Publication Data

US 2023/0054840 A1 Feb. 23, 2023

(30) Foreign Application Priority Data

Aug. 17, 2021 (JP) ................. 2021-132774

(51) Int. Cl.
*G08B 21/00* (2006.01)
*G07C 5/00* (2006.01)
(52) U.S. Cl.
CPC ................. *G07C 5/006* (2013.01)
(58) Field of Classification Search
CPC ............ G07C 5/006; G07C 5/008; G05B 2219/24019; G05B 2219/32226; G05B 19/042; G05B 2219/2637; G06Q 10/20; G06Q 20/389; G06Q 20/401; G06Q 10/103; B60W 50/14; B60W 2050/146; H04W 4/14
USPC ............. 340/679, 439, 457, 438, 425.5
See application file for complete search history.

(56) References Cited

U.S. PATENT DOCUMENTS

| | | | |
|---|---|---|---|
| 2012/0029759 A1* | 2/2012 | Suh | G07C 5/085 701/29.4 |
| 2017/0132575 A1* | 5/2017 | Buren | G06Q 10/1095 |
| 2022/0375271 A1* | 11/2022 | Benkreira | G06Q 10/103 |
| 2022/0414568 A1* | 12/2022 | Surace | G06Q 10/0631 |

FOREIGN PATENT DOCUMENTS

WO 2020184376 A1 9/2020

* cited by examiner

*Primary Examiner* — Anh V La
(74) *Attorney, Agent, or Firm* — HAUPTMAN HAM, LLP (57) ABSTRACT

A maintenance information management device includes an information registration unit configured to register vehicle identification information and maintenance information in a memory for each vehicle, an information update unit configured to update the maintenance information after the maintenance of the vehicle by adding maintenance contents to the maintenance information registered in the memory, and an information providing unit configured to provide the maintenance information when a provision request for the maintenance information is accepted.

19 Claims, 6 Drawing Sheets

MAINTENANCE INFORMATION MANAGEMENT DEVICE AND MAINTENANCE INFORMATION MANAGEMENT METHOD

CROSS-REFERENCE TO RELATED APPLICATION

This application claims priority to Japanese Patent Application No. 2021-132774 filed on Aug. 17, 2021, incorporated herein by reference in its entirety.

BACKGROUND

1. Technical Field

The present disclosure relates to a maintenance information management device and a maintenance information management method.

2. Description of Related Art

WO 2020/184376 discloses a ledger management system that manages information using ledger management nodes each having unique information and recorded information. More specifically, in the ledger management system disclosed in WO 2020/184376, the recorded information includes the use history information and the maintenance information on a vehicle, and the information entered by a maintenance engineer is sent to the diagnostic device as the maintenance information and is managed in that device.

SUMMARY

However, the ledger management system described in WO 2020/184376 has a configuration in which maintenance information is used for calculating the price of a vehicle at the time of a vehicle sales transaction. Therefore, there is room for improvement in allowing maintenance information to be made available for wide use.

It is an object of the present disclosure to provide a maintenance information management device and a maintenance information management method that allow maintenance information to be made available for wide use.

A first aspect of the present disclosure relates to a maintenance information management device including an information registration unit, an information update unit, and an information providing unit. The information registration unit is configured to register vehicle identification information and maintenance information in the memory for each vehicle. The information update unit is configured to update the maintenance information after the maintenance of the vehicle by adding maintenance contents to the maintenance information registered in the memory. The information providing unit is configured to provide the maintenance information when a provision request for the maintenance information is accepted.

In the maintenance information management device according to the first aspect, the information registration unit registers the vehicle identification information and the maintenance information in the memory for each vehicle. After the maintenance of the vehicle, the information updating unit updates the maintenance information by adding the maintenance contents to the maintenance information registered in the memory. In addition, when a provision request for the maintenance information is accepted, the information providing unit provides the maintenance information. This allows even a third party other than a mechanic to refer to the maintenance information.

In the maintenance information management device according to the first aspect, the maintenance information may include at least the information on a replaced part.

The maintenance information management device according to the first aspect makes it possible to refer to the history of the vehicle part replacement of the vehicle after the maintenance information is registered in the memory.

In the maintenance information management device according to the first aspect, when the owner of the vehicle is changed, the information providing unit may provide the maintenance information to the changed owner.

The maintenance information management device according to the first aspect allows the new owner to confirm the maintenance information on the vehicle.

A second aspect of the present disclosure relates to a maintenance information management method including registering, updating, and providing. The registering registers vehicle identification information and maintenance information on a vehicle in the memory. The updating updates the maintenance information registered in the memory after the maintenance of the vehicle. The providing provides the maintenance information when a provision request for the maintenance information is accepted.

As described above, the maintenance information management device and the maintenance information management method according to the present disclosure allow maintenance information to be made available for wide use.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A maintenance information management device 10 according to an embodiment will be described with reference to the drawings.

Figure 1:
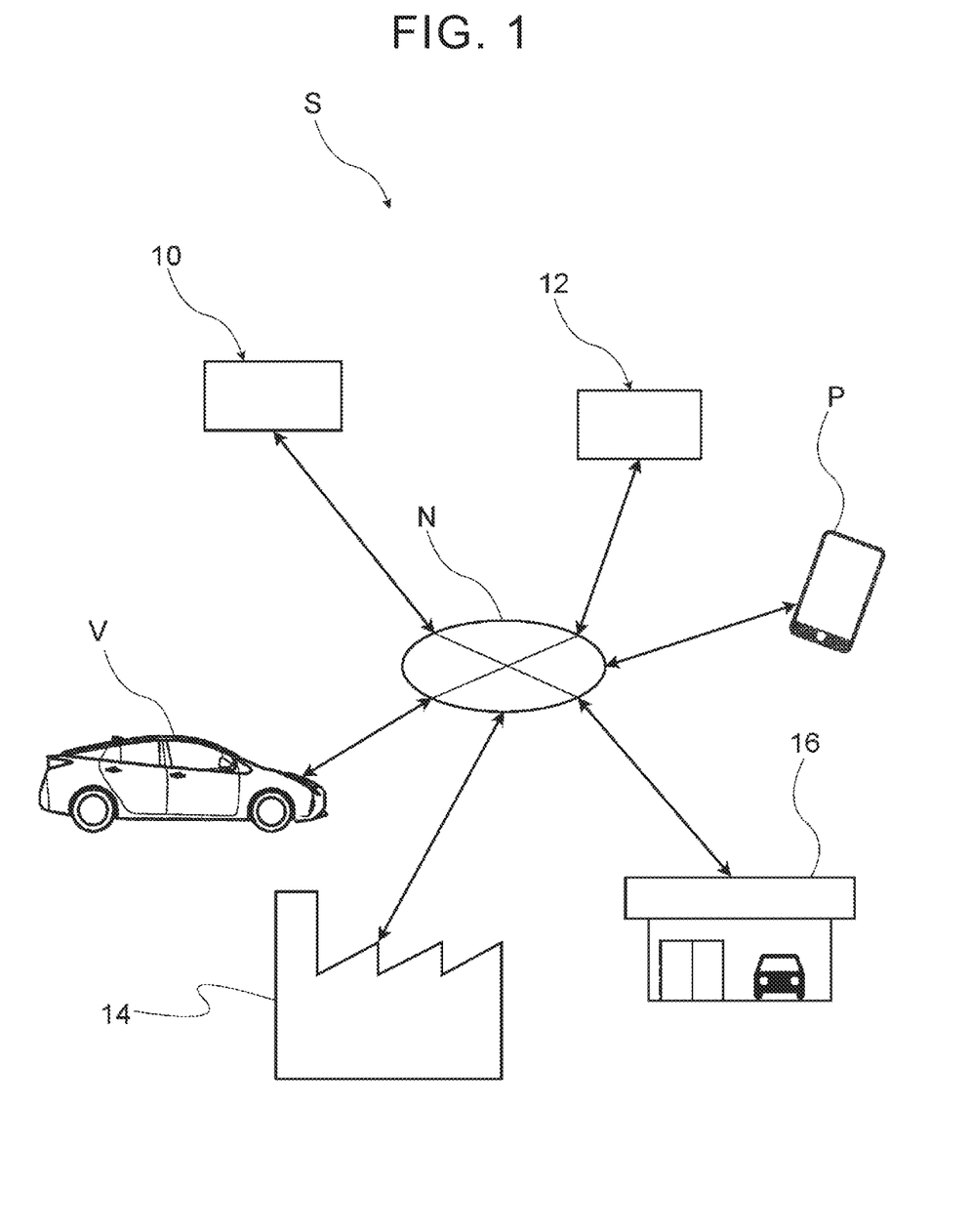
FIG. 1 is an overall configuration diagram of a system including a vehicle maintenance management device according to an embodiment.

As shown in FIG. 1, a system S in this embodiment includes a maintenance information management device 10, a management server 12, a vehicle V, and a terminal P. The maintenance information management device 10, the management server 12, an in-vehicle apparatus of the vehicle V. and the terminal P are connected to each other so that they can communicate with each other through a network N. In addition, the maintenance information management device 10 is connected to a maintenance factory 14 and a dealer 16 through the network N so that they can communicate with each other. Although a plurality of vehicle Vs are connected to the network N, only one vehicle V is shown in FIG. 1 for convenience of description.

The maintenance factory 14 is an example of a factory where the maintenance of the vehicle V is done; for example, a part of the vehicle V is repaired or replaced in the maintenance factory 14. In this maintenance factory 14, a management device (not shown) is installed. Using this management device, data on the maintenance information can be sent and received to and from the maintenance information management device 10 through the network N.

The dealer 16 is an example of a store where the maintenance of the vehicle V is done; for example, a part of the vehicle V is repaired or replacement in the dealer 16. In this dealer 16, a management device (not shown) is installed. Using this management device, data on the maintenance information can be sent and received to and from the maintenance information management device 10 through the network N.

The maintenance information management device 10 in this embodiment is configured to update the maintenance information after the maintenance of the vehicle V and to provide the maintenance information when a provision request for the maintenance information is accepted.

Hardware Configuration of Maintenance Information Management Device 10

Figure 2:
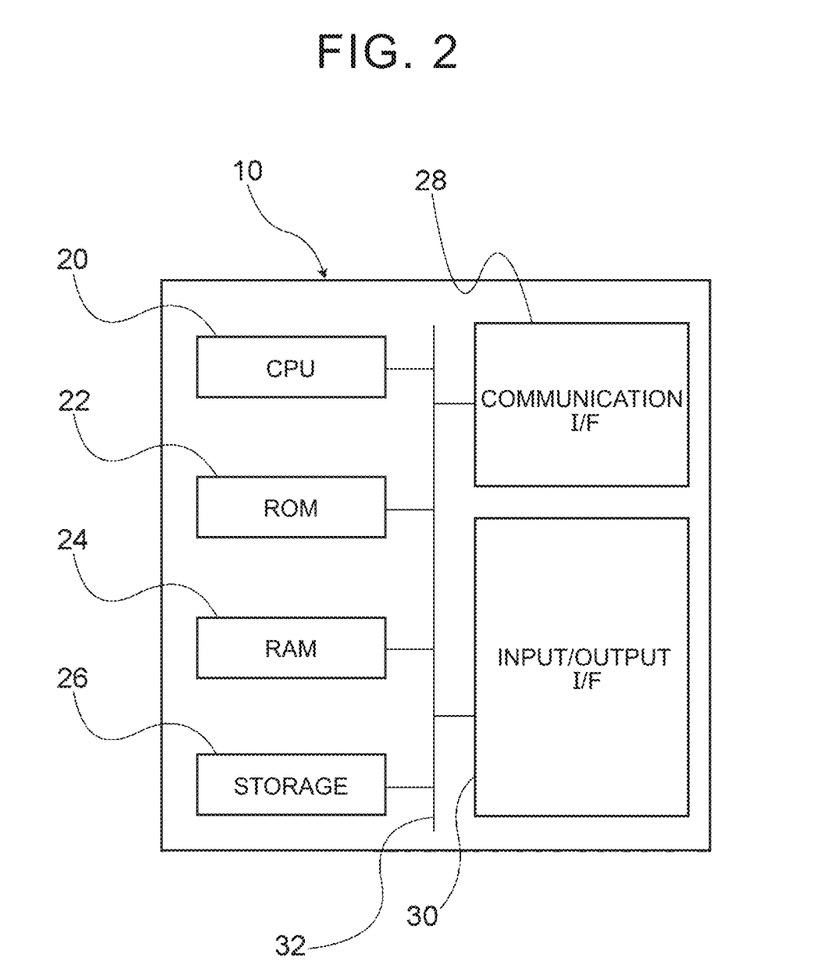
FIG. 2 is a block diagram showing a hardware configuration of the vehicle maintenance management device according to the embodiment.

FIG. 2 is a block diagram showing a hardware configuration of the maintenance information management device 10. As shown in FIG. 2, the maintenance information management device 10 includes a central processing unit (CPU: processor) 20, a read only memory (ROM) 22, a random-access memory (RAM) 24, a storage 26, a communication I/F (communication interface) 28, and an input/output I/F (input/output interface) 30. The configuration components are connected to each other via a bus 32 so that they can communicate with each other.

The CPU 20 is a central arithmetic processing unit that executes various types of programs and controls the components. That is, the CPU 20 reads a program from the ROM 22 or the storage 26 and executes the program using the RAM 24 as a work area. The CPU 20 controls each of the above configuration components and performs various types of arithmetic processing according to the programs recorded in the ROM 22 or the storage 26.

The ROM 22 stores various types of programs and various types of data. The RAM 24 is used as a work area to temporarily store programs or data. The storage 26, configured by a hard disk drive (HDD) or a solid-state drive (SSD), stores various types of programs, including the operating system, and various types of data. In this embodiment, the ROM 22 or the storage 26 stores programs, which perform processing such as the information registration processing and the information update processing, and various types of data.

The communication/F 28 is an interface for the maintenance information management device 10 to communicate with the management server 12 and other devices. For this interface, the standard such as Controller Area Network (CAN), Ethernet (registered trademark), Long Term Evolution (LTE), Fiber Distributed Data Interface (FDDI), or Wi-Fi (registered trademark) is used.

Hardware Configuration of Management Server 12

Figure 3:
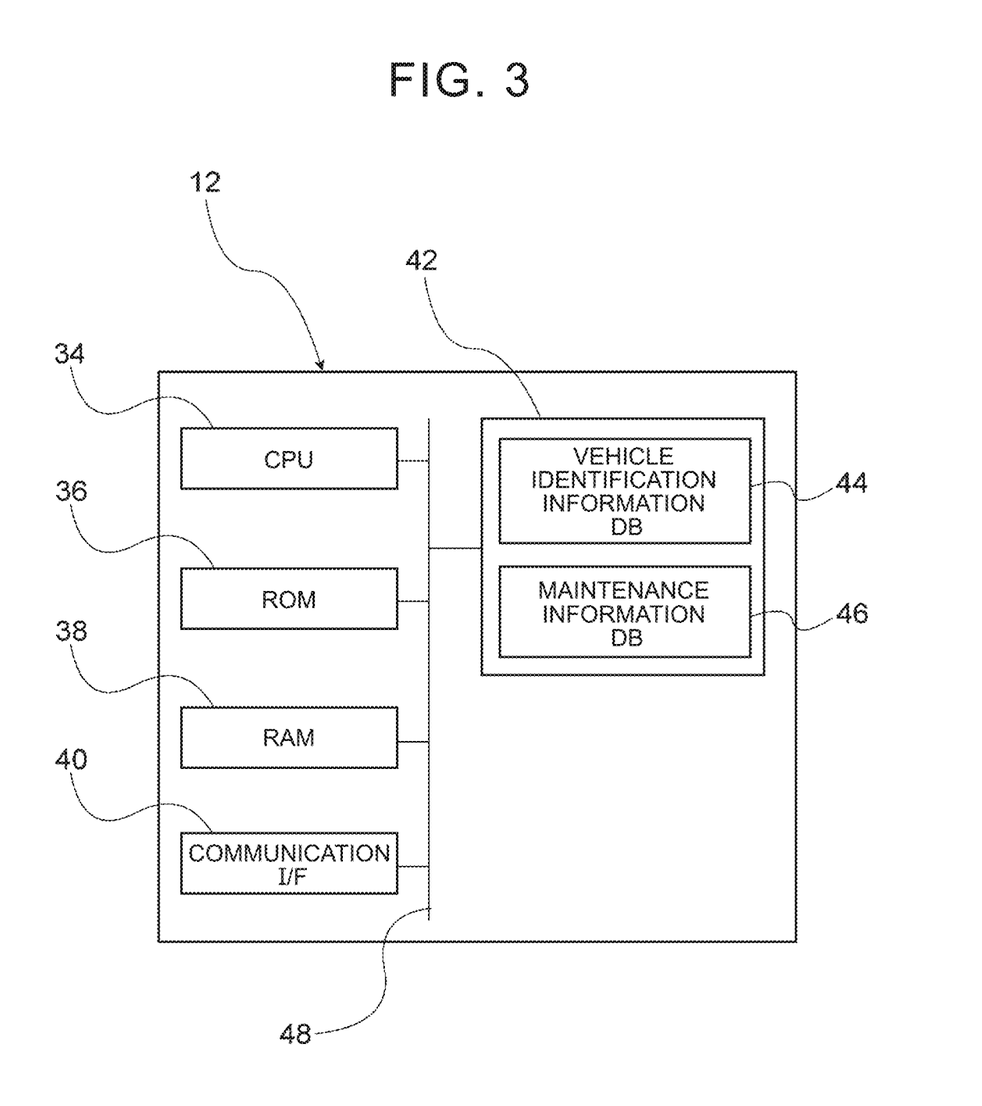
FIG. 3 is a block diagram showing a hardware configuration of a server in the embodiment.

FIG. 3 is a block diagram showing a hardware configuration of the management server 12. As shown in FIG. 3, the management server 12 includes a central processing unit (CPU: processor) 34, a read only memory (ROM) 36, a random-access memory (RAM) 38, a communication interface (communication I/F) 40, and a storage 42 used as a memory. The configuration components are connected to each other via a bus 48 so that they can communicate with each other.

The CPU 34 is a central arithmetic processing unit that executes various types of programs and controls the components. The ROM 36 stores various types of programs and various types of data. The RAM 38 is used as a work area to temporarily store programs or data.

The communication/F 40 is an interface for communicating with the maintenance information management device 10 and other devices. For this interface, the standard such as Controller Area Network (CAN), Ethernet, Long Term Evolution (LTE), Fiber Distributed Data Interface (FDDI), or Wi-Fi is used.

The storage 42, which is used as a memory, is configured by a hard disk drive (HDD) or a solid-state drive (SSD) for storing various types of programs and various types of data. In this embodiment, the storage 42 stores a vehicle identification information database (DB) 44 and a maintenance information DB (database) 46.

The vehicle identification information DB 44 is a database that stores unique information for identifying a vehicle. The unique information, such as a manufacturing number and a serial number, is used as the vehicle identification information.

The maintenance information DB 46 is a database that stores information such as the equipment information, parts information, and maintenance history for each vehicle V. The maintenance information DB 46 also stores a wide range of information on the maintenance of the vehicle V, such as the repair date and time, repaired parts, part replacement date and time, and replaced parts. In addition, the maintenance information DB 46 is managed in such a way that it corresponds to the vehicle identification information DB 44. For example, in the information on each vehicle in the vehicle identification information DB 44, the number of the vehicle used in the maintenance information DB 46 may be registered.

Functional Configuration of Maintenance Information Management Device 10

The maintenance information management device 10 implements various types of functions using the hardware resources described above. The functional configuration implemented by the maintenance information management device 10 will be described with reference to FIG. 4.

Figure 4:
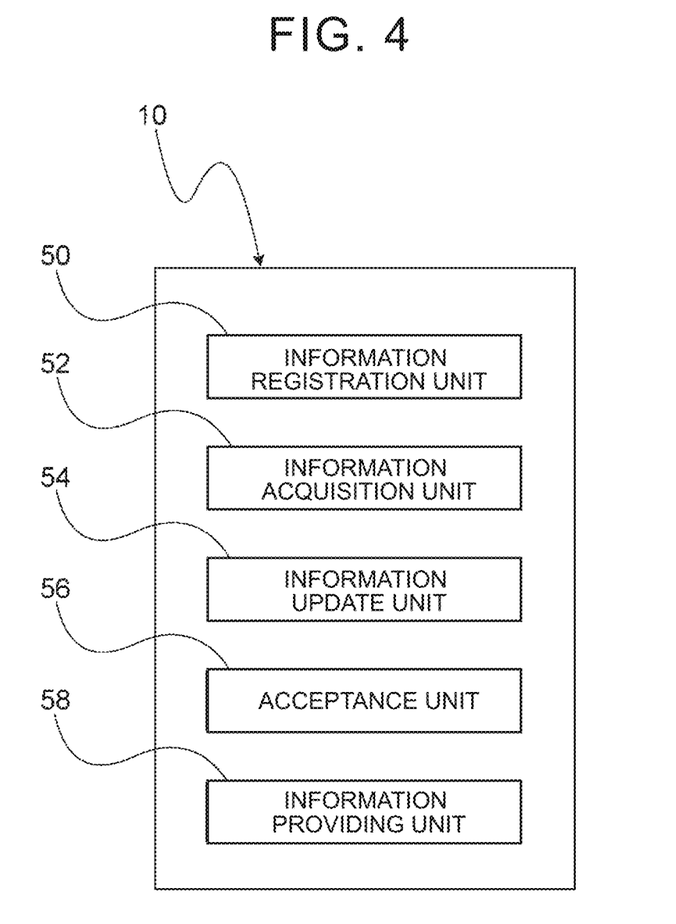
FIG. 4 is a block diagram showing a functional configuration of the vehicle maintenance management device according to the embodiment.

As shown in FIG. 4, the maintenance information management device 10 includes the following functional components: an information registration unit 50, an information acquisition unit 52, an information update unit 54, an acceptance unit 56, and an information providing unit 58. Each functional component is implemented when the CPU 20 reads the program from the ROM 22 or the storage 26 and executes it.

The information registration unit 50 registers the vehicle identification information and the maintenance information on each vehicle V in the storage 42 of the management server 12. More specifically, when a registration request is received from the in-vehicle apparatus of the vehicle V, the information registration unit 50 acquires the vehicle identification information from the in-vehicle device and stores the acquired information in the vehicle identification information DB 44. When the maintenance information is stored in the in-vehicle device, the information registration unit 50 acquires the maintenance information from the in-vehicle device and stores the acquired information in the maintenance information DB 46.

The information acquisition unit 52 acquires the maintenance information, stored in the maintenance information DB 46, from the storage 42 of the management server 12. More specifically, the information acquisition unit 52 acquires the maintenance information, corresponding to the vehicle identification information on the vehicle V, from the storage 42. For example, the information acquisition unit 52 acquires the maintenance information to refer to the maintenance history of the vehicle V before the vehicle V is maintained. For example, the information acquisition unit 52 acquires the current maintenance information to update the maintenance information after the vehicle V is maintained.

The information update unit 54 adds the maintenance contents to the maintenance information, registered in the storage 42, to update the maintenance information after the vehicle V is maintained. More specifically, the information update unit 54 adds the information about the contents of the current maintenance to the maintenance information acquired from the information acquisition unit 52. In addition, the information update unit 54 stores the maintenance information, to which the maintenance contents have been added, in the storage 42 again. The maintenance contents mentioned above include the repaired parts, repair date and time, replacement parts, replacement date and time, and other maintenance contents.

The acceptance unit 56 accepts a provision request for the maintenance information. More specifically, the acceptance unit 56 accepts a provision request for the maintenance information from the terminal P via the Internet. Note that, though a mobile terminal used by the user is used in the example in this embodiment, the terminal P is not limited to it. Instead, the acceptance unit 56 may accept a provision request for the maintenance information from a computer installed in the maintenance factory 14 or the dealer 16.

When accepting a provision request for the maintenance information, the acceptance unit 56 may check the data, accepted from the information provision requester, to determine whether the maintenance information may be provided. That is, when the maintenance information may be provided to the requester, the acceptance unit 56 accepts the provision request for the maintenance information. On the other hand, when the maintenance information may not be provided to the requester, the acceptance unit 56 rejects to accept the provision request for the maintenance information and sends a message to the requester to indicate that maintenance information may not be provided.

The information providing unit 58 provides the maintenance information when the acceptance unit 56 accepts a provision request for the maintenance information. More specifically, the information providing unit 58 sends the maintenance information, acquired by the information acquisition unit 52 from the storage 42, to the requester.

In addition, when the signal indicating that the owner of the vehicle V has changed is received, the information providing unit 58 provides the maintenance information to the changed owner even when a provision request is not received. For example, when the owner change procedure is performed at the dealer 16, the information about the new owner is sent to the maintenance information management device 10. Then, the information providing unit 58 acquires the maintenance information from the storage 42 and sends the acquired maintenance information to the new owner.

Operation

Next, the operation of this embodiment will be described.

Example of Processing

Figure 5:
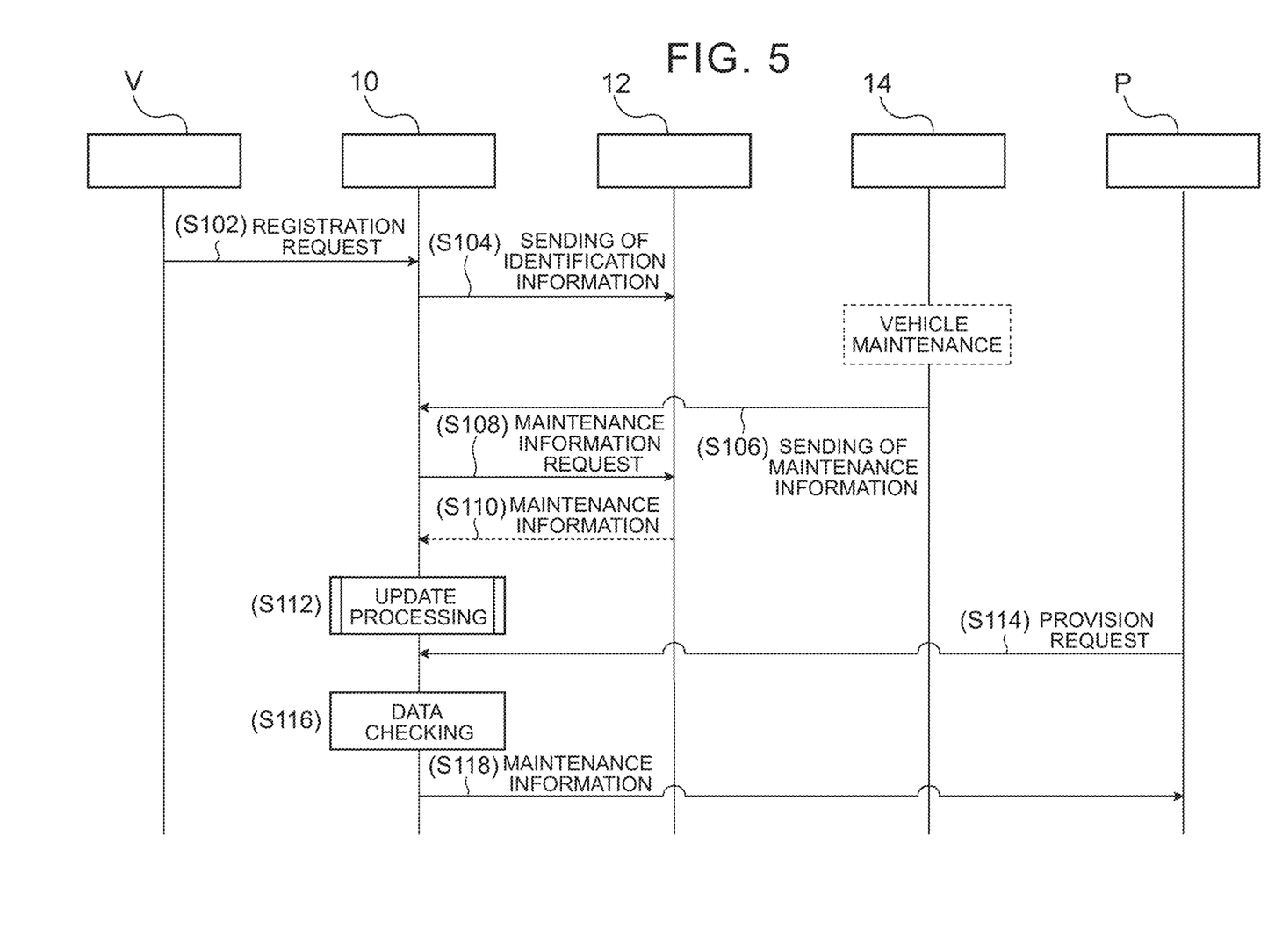
FIG. 5 is a sequence diagram showing a flow of processing in a system including the vehicle maintenance management device according to the embodiment.

FIG. 5 is a sequence diagram showing an example of the flow of processing performed by the system S in this embodiment. With reference to this sequence diagram, the operation of the vehicle V, the maintenance information management device 10, the management server 12, the maintenance factory 14, and the terminal P will be described.

In step S102 in FIG. 5, the in-vehicle apparatus of the vehicle V sends a maintenance information registration request to the maintenance information management device 10. An occupant of the vehicle V may also operate the vehicle V directly or indirectly to send a maintenance information registration request. A mechanic may also operate the vehicle V directly or indirectly to send a maintenance information registration request.

In step S104, the vehicle identification information is sent from the maintenance information management device 10 to the management server 12. More specifically, the vehicle identification information on the vehicle V is sent to the management server 12 by the function of the information registration unit 50 and is stored in the vehicle identification information DB 44 constituting the storage 42. At this time, when the maintenance information on the vehicle V is registered, the maintenance information may be stored in the maintenance information DB 46 in the storage 42 by the function of the information registration unit 50.

On the other hand, after the vehicle V is maintained at the maintenance factory 14, the maintenance information on the vehicle V is sent from the terminal of the maintenance factory 14 to the maintenance information management device 10 in step S106. More specifically, the data on repair and the data on part replacement at the maintenance factory 14 is sent to the maintenance information management device 10.

In step S108, the maintenance information management device 10 sends a maintenance information request to the management server 12. In step S110, the maintenance information management device 10 receives the maintenance information from the management server 12. That is, in step S108 and step S110, the maintenance information management device 10 uses the function of the information acquisition unit 52 to acquire the maintenance information on the vehicle V, which is stored in the maintenance information DB 46, from the storage 42 of the management server 12.

Next, in step S112, the information update unit 54 performs the update processing. The flow of update processing will be described later.

In step S114, the terminal P sends a provision request for the maintenance information to the maintenance information management device 10. In step S116, the maintenance information management device 10 checks the data. That is, the maintenance information management device 10 in the example of this embodiment is configured to provide maintenance information only to an authorized requester. Therefore, the maintenance information management device 10 checks the data to confirm whether the requester, who has sent the provision request for the maintenance information, is an authorized requester. For example, in the storage 26 of the maintenance information management device 10, a list of authorized requesters is stored in advance. The maintenance information management device 10 may check this list to see whether the data on the requester is included in this list. Alternatively, the maintenance information management device 10 may determine that the requester is an authorized requester, for example, when it is confirmed that the predetermined password, which is set for each vehicle V, has been entered.

In step S118, the maintenance information on the vehicle V is sent from the maintenance information management device 10 to the terminal P. In the above description, it is assumed that the vehicle V is maintained at the maintenance factory 14. When the vehicle V is maintained at the dealer 16, the maintenance factory 14 in FIG. 5 is replaced by the dealer 16 and the other processing is performed as shown in FIG. 5.

Information Update Processing

Figure 6:
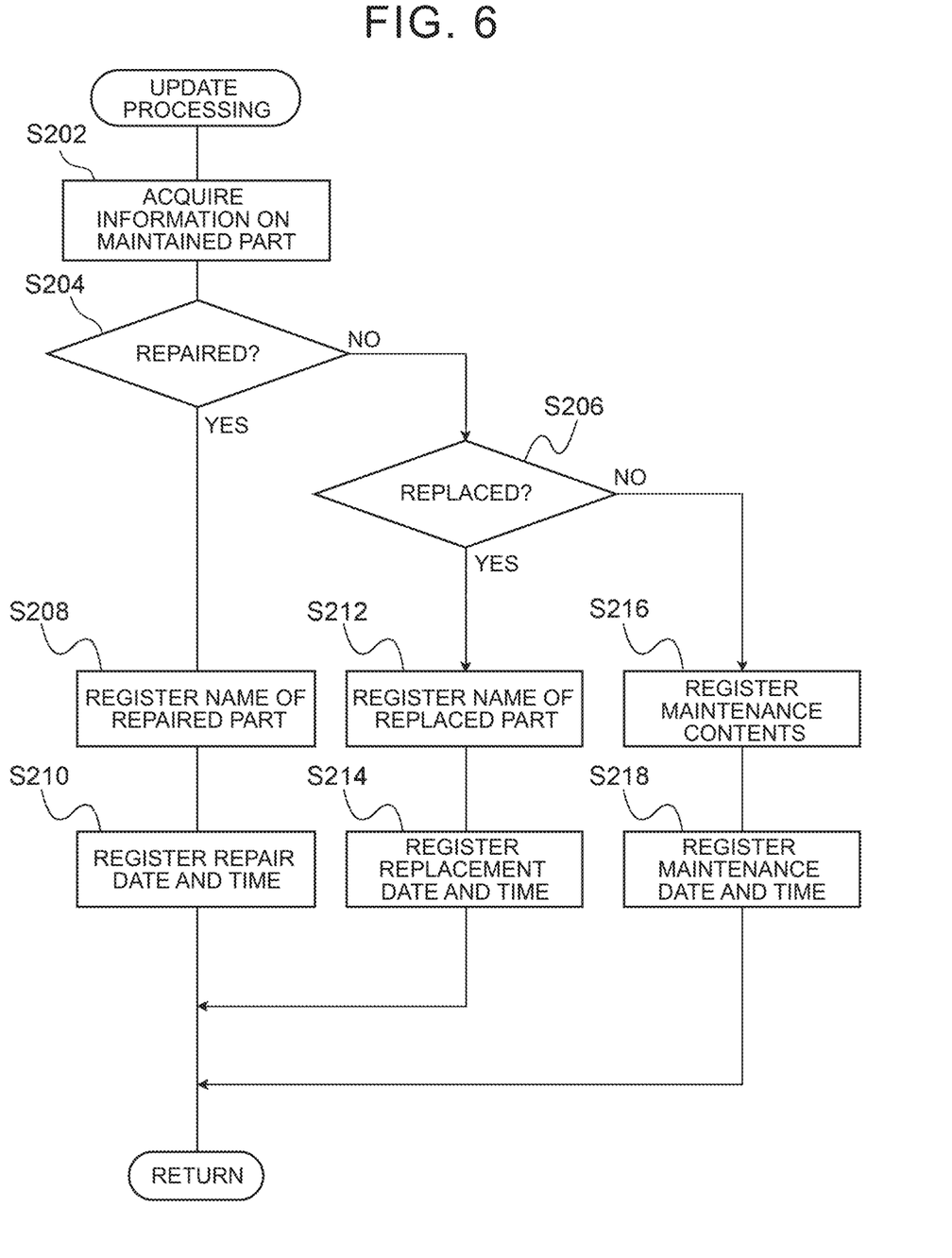
FIG. 6 is a flowchart showing a flow of information update processing performed in the vehicle maintenance management device according to the embodiment.

FIG. 6 is a flowchart showing an example of the flow of information update processing performed by the maintenance information management device 10 according to this embodiment. This information update processing is performed when the CPU 20 reads the program from the ROM 22 or the storage 26 into the RAM 24.

In step S202 in FIG. 6, the CPU 20 acquires the information on a maintained part. More specifically, the CPU 20 acquires the predetermined information from the maintenance information recorded in the system of the maintenance factory 14. When there is a plurality of maintained parts, the CPU 20 may repeat the information update processing for each maintained part.

In step S204, the CPU 20 determines whether the maintained part was repaired. That is, when the recorded history indicates that the part was not replaced but repaired in the maintenance factory 14, the CPU 20 makes an affirmative determination in step S204 and the processing proceeds to step S208. On the other hand, when there is no history indicating a repair in step S204, the CPU 20 makes a negative determination in step S204 and the processing proceeds to the processing in step S206.

In step S208, the CPU 20 registers the name of the repaired part in the maintenance information. More specifically, the CPU 20 adds the information on the part repaired in the current maintenance to the maintenance information acquired from the maintenance information DB 46.

In step S210, the CPU 20 adds the repair date and time to the maintenance information. Then, the CPU 20 ends the information update processing.

On the other hand, when a negative determination is made in step S204, the CPU 20 determines in step S206 whether the maintained part was replaced. That is, when the recorded history indicates that the part was replaced in the maintenance factory 14, the CPU 20 makes an affirmative determination in step S206 and the processing proceeds to step S212. On the other hand, when there is no history indicating a part replacement in step S206, the CPU 20 makes a negative determination in step S206 and the processing proceeds to step S216.

In step S212, the CPU 20 registers the name of the replaced part in the maintenance information. More specifically, the CPU 20 adds the information on the part replaced in the current maintenance to the maintenance information acquired from the maintenance information DB 46.

In addition, in step S214, the CPU 20 adds the replacement date and time of the part to the maintenance information. Then, the CPU 20 ends the information update processing.

On the other hand, when a negative determination is made in step S206, the CPU 20 registers the maintenance contents in the maintenance information in step S216. In this step, the CPU 20 registers the maintenance contents other than a part repair and a part replacement. For example, the CPU 20 adds maintenance contents, such as inspection and supply of consumables, to the maintenance information.

In step S218, the CPU 20 adds the maintenance date and time to the maintenance information. Then, the CPU 20 ends the information update processing.

As described above, the maintenance information management device 10 according to this embodiment causes the information registration unit 50 to register, for each vehicle V, the vehicle identification information and the maintenance information in the storage 42. In addition, after the maintenance of the vehicle V, the maintenance information management device 10 causes the information update unit 54 to add the maintenance contents to the maintenance information, registered in the storage 42, to update the maintenance information.

Furthermore, when a provision request for the maintenance information is accepted, the maintenance information management device 10 causes the information providing unit 58 to provide the maintenance information. This allows even a third party, other than a mechanic, to refer to the maintenance information. Thais means that the maintenance information can be made available more widely.

In addition, since the maintenance information includes the information on the replaced parts in this embodiment. it is possible to refer to the history of the part replacement of the vehicle V after the maintenance information is registered in the storage 42.

Furthermore, when the owner of the vehicle V is changed, the maintenance information is provided to the changed owner in this embodiment. This allows the new owner to confirm the maintenance information on the vehicle V.

Although the maintenance information management device 10 according to the embodiment and its modification has been described above, it is of course possible to implement the maintenance information management device 10 in various modes without departing from the spirit of the present disclosure. The maintenance information, though recorded in the management server 12 used as the memory in the above embodiment, may be recorded by any other method. For example, using the blockchain technique, the maintenance information may be managed on multiple nodes with the use of a distributed ledger.

In addition, the processing the CPU 20 performs by reading the program may be performed by various types of processors other than the CPU 20. Examples of processors in this case include (1) a programmable logic device (PLD), such as a field-programmable gate array (FPGA), having a circuit configuration that can be changed after fabrication and (2) a dedicated electric circuit, such as an application specific integrated circuit (ASIC), that is a processor having a circuit configuration designed exclusively for performing specific processing. In addition, each processing may be performed by one of these various types of processors, or may be performed by a combination of two or more processors of the same type or different types, for example, by a plurality of FPGAs or by a combination of a CPU and an FPGA. The hardware configuration of each of these processors is, more specifically, an electric circuit created by a combination of circuit devices such as semiconductor devices.

Although the programs are stored (installed) in a computer-readable, non-transitory recording medium in advance in the embodiment described above, the present disclosure is not limited to this mode. Instead, the programs may be provided in a form recorded in a non-transitory recording medium such as a compact disc read only memory (CD-ROM), a digital versatile disc read only memory (DVD-ROM), or a universal serial bus (USB) memory. The programs may also be downloaded from an external device via a network.

In addition, since the processing flow described in the above embodiment is an example only, unnecessary steps may be deleted, new steps may be added, or the processing order may be changed within the scope not departing from the spirit of the disclosure.

What is claimed is:

1. A maintenance information management device comprising:
 an information registration unit configured to register vehicle identification information in a memory for each vehicle;
 an information update unit configured to obtain maintenance information based on maintenance contents from a maintenance factory, and update the maintenance information by adding maintenance contents to the maintenance information, the maintenance contents being received in response to maintenance of the vehicle; and
 an information providing unit configured to provide the maintenance information when a provision request for the maintenance information is accepted.

2. The maintenance information management device according to claim 1, wherein the maintenance information includes at least information on a replaced part.

3. The maintenance information management device according to claim 1, wherein, when an owner of the vehicle is changed, the information providing unit is configured to provide the maintenance information to a changed owner.

4. The maintenance information management device according to claim 1, wherein the maintenance contents include at least one of repair parts, repair date and time, replacement parts, replacement date and time, or other maintenance contents.

5. The maintenance information management device according to claim 3, wherein the maintenance information is provided to a changed owner when the provision request is received from an authorized requester.

6. The maintenance information management device according to claim 5, wherein the authorized requested is at least one of the maintenance factory, a dealer, or a requester who entered a predetermined password associated with the vehicle.

7. The maintenance information management device according to claim 1, wherein the information registration unit is configured to acquire the vehicle identification information in response to receiving a registration request from an in-vehicle apparatus of the vehicle.

8. The maintenance information management device according to claim 1, wherein the information registration unit is configured to acquire the maintenance information from an in-vehicle apparatus of the vehicle.

9. A maintenance information management method comprising:
 registering vehicle identification information and maintenance information on a vehicle in a memory;
 updating the maintenance information registered in the memory after maintenance of the vehicle, contents of the maintenance to the vehicle being received from a maintenance factory and added to the maintenance information; and
 providing the maintenance information when a provision request for the maintenance information is accepted.

10. The maintenance information management method according to claim 9, wherein registering the vehicle identification information comprises registering the vehicle identification information in response to receiving a registration request from an in-vehicle apparatus of the vehicle.

11. The maintenance information management method according to claim 9, further comprising acquiring the maintenance information from an in-vehicle apparatus of the vehicle.

12. A system comprising:
 an in-vehicle device within a vehicle, wherein the in-vehicle device is configured to transmit a registration request; and
 a maintenance information management device configured to receive the registration request, wherein the maintenance information management device comprises:
  an information registration unit configured to register vehicle identification information in a memory for each vehicle;
  an information update unit configured to obtain maintenance information based on maintenance contents from a maintenance factory, and update the maintenance information by adding maintenance contents to the maintenance information, the maintenance contents being received in response to maintenance of the vehicle; and
  an information providing unit configured to provide the maintenance information when a provision request for the maintenance information is accepted.

13. The system according to claim 12, wherein the maintenance information includes at least information on a replaced part.

14. The system according to claim 12, wherein, when an owner of the vehicle is changed, the information providing unit is configured to provide the maintenance information to a changed owner.

15. The system according to claim 12, wherein the maintenance contents include at least one of repair parts, repair date and time, replacement parts, replacement date and time, or other maintenance contents.

16. The system according to claim 14, wherein the maintenance information is provided to a changed owner when the provision request is received from an authorized requester.

17. The system according to claim 16, wherein the authorized requested is at least one of the maintenance factory, a dealer, or a requester who entered a predetermined password associated with the vehicle.

18. The system according to claim 12, wherein the information registration unit is configured to acquire the vehicle identification information in response to receiving the registration request from the in-vehicle device.

19. The system according to claim 12, wherein the information registration unit is configured to acquire the maintenance information from the in-vehicle device.

* * * * *